US011548456B2

(12) United States Patent
Shi et al.

(10) Patent No.: US 11,548,456 B2
(45) Date of Patent: Jan. 10, 2023

(54) CAN CIRCUIT STRUCTURE AND VEHICLE DIAGNOSTIC DEVICE INCLUDING THE SAME (71) Applicant: AUTEL INTELLIGENT TECHNOLOGY CORP., LTD., Guangdong (CN)

(72) Inventors: Sanbao Shi, Guangdong (CN); Yang Li, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 24 days.

(21) Appl. No.: 17/144,356

(22) Filed: Jan. 8, 2021

(65) Prior Publication Data
US 2021/0129772 A1 May 6, 2021

Related U.S. Application Data (63) Continuation of application No. PCT/CN2019/108537, filed on Sep. 27, 2019.

(30) Foreign Application Priority Data

Sep. 28, 2018 (CN) .......................... 201821597707.5

(51) Int. Cl.
*B60R 16/023* (2006.01)
*G06F 13/38* (2006.01)
(Continued)

(52) U.S. Cl.
CPC .......... *B60R 16/023* (2013.01); *G06F 13/385* (2013.01); *G06F 13/4072* (2013.01); *G06F 13/42* (2013.01); *H04L 2012/40215* (2013.01)

(58) Field of Classification Search
CPC .................... B60R 16/023; H04L 2012/40215
See application file for complete search history.

(56) References Cited

U.S. PATENT DOCUMENTS

2003/0145121 A1* 7/2003 Watkins ................ G06F 13/385
709/250
2005/0116761 A1* 6/2005 Pentakota ................. H03F 3/72
327/309

(Continued)

FOREIGN PATENT DOCUMENTS

CN   102490669 A   6/2012
CN   102490669 A   6/2012
(Continued)

OTHER PUBLICATIONS

International Search Report dated Dec. 27, 2019; PCT/CN2019/108537.
(Continued)

*Primary Examiner* — Henry Tsai
*Assistant Examiner* — Aurangzeb Hassan (57) ABSTRACT A CAN circuit structure and a vehicle diagnostic device are provided. The CAN circuit structure includes: a pair of data buses on which differential signals are transmitted; a CAN transceiver operating in a first voltage domain; a clamp circuit disposed between the CAN transceiver and the data buses for clamping a high level or a low level of the differential signals; a CAN controller operating in a second voltage domain; and a signal isolation circuit disposed between the CAN transceiver and the CAN controller for isolating the first voltage domain from the second voltage domain. The circuit allows for the use of a standard CAN transceiver chip that meets a general standard in a special CAN circuit structure, thus effectively reducing manufacturing costs of related devices.

14 Claims, 4 Drawing Sheets (51) Int. Cl.
   *G06F 13/40*     (2006.01)
   *G06F 13/42*     (2006.01)
   *H04L 12/40*     (2006.01)

(56)        References Cited

U.S. PATENT DOCUMENTS

2006/0091915 A1    5/2006  Pauletti et al.
2006/0106966 A1    5/2006  Joos et al.
2013/0103959 A1*   4/2013  Hatta ..................... H04L 12/12
                                                      713/300
2016/0036604 A1*   2/2016  Mori .................... H04L 25/029
                                                      375/296
2016/0204818 A1*   7/2016  Kim ........................ H04B 1/40
                                                      375/219
2018/0255072 A1*   9/2018  Takada ................... H04L 12/66
2018/0302165 A1*  10/2018  Truong ................. H04B 10/66
2019/0288870 A1*   9/2019  de Haas ............ H04L 12/40032
2019/0385057 A1*  12/2019  Litichever ............... H04L 63/14

FOREIGN PATENT DOCUMENTS

CN        204304418 U        4/2015
CN        105068528 A       11/2015
CN        106992508 A        7/2017
CN        109050444 A       12/2018
CN        209351354 U        9/2019

OTHER PUBLICATIONS

The Extended European Search Report dated Jun. 30, 2021; Appln. No. 19865451.9.

* cited by examiner

CAN CIRCUIT STRUCTURE AND VEHICLE DIAGNOSTIC DEVICE INCLUDING THE SAME

This application is a continuation of International Patent Application No. PCT/CN2019/108537 filed on Sep. 27, 2019, which claims priority to Chinese Patent Application No. 201821597707.5 filed on Sep. 28, 2018, both of which are incorporated by reference herein in their entireties.

BACKGROUND

Technical Field

The present application relates to the technical field of vehicle diagnosis, and in particular, to a CAN circuit structure and a vehicle diagnostic device including the same.

Related Art

In the automobile industry, in consideration of requirements for safety, comfort, convenience, low pollution and low costs, automobile manufacturers developed a plurality of different electronic control systems. Since requirements for data types and reliability for communication between the electronic control systems are different, a number of wire harnesses increases, which brings difficulties to automobile manufacturing and design.

In order to meet the requirements of "reducing the number of wire harnesses" and "performing high-speed communication for a large amount of data through a plurality of LANs", Bosch, a German electrical company, developed the CAN communication protocol for automobiles in 1986.

A controller area network (CAN for short) is one of the most widely used fieldbuses in the world after being standardized by ISO11898 and ISO11519, which provides powerful technical support for a distributed control system to achieve real-time and reliable data communication between nodes.

During implementation of the present invention, the inventor finds at least the following problems in the prior art. There are still a plurality of different versions of stipulations for signals at logic levels in the existing automobile CAN protocol specification, for example, a general CAN protocol specification and a CAN protocol specification for a 24V trailer.

In different versions, only CAN transceiver chips in conformity with corresponding standards can achieve communication with the CAN for reading information about the automobile. As a result, a use range of the standard CAN transceiver chip is restricted and some non-standard or general CANs need tailored CAN transceiver chips, resulting in increased manufacturing costs.

SUMMARY

In order to resolve the above technical problems, embodiments of the present invention provide a CAN circuit structure that is applicable to a specific CAN specification and a vehicle diagnosis device including the same.

In order to resolve the above technical problems, the embodiments of the present invention provide the following technical solutions: a CAN circuit structure, including:

a pair of data buses on which differential signals are transmitted; a CAN transceiver operating in a first voltage domain, where the CAN transceiver is connected to the data buses for receiving and transmitting the differential signals; a clamp circuit disposed between the CAN transceiver and the data buses for clamping a high level or a low level of the differential signals, so that a difference between voltages of the differential signals is adapted to the CAN transceiver; a CAN controller operating in a second voltage domain, where the CAN controller is connected to the CAN transceiver for communicating with the CAN transceiver; and a signal isolation circuit disposed between the CAN transceiver and the CAN controller for isolating the first voltage domain from the second voltage domain.

In some embodiments, the CAN circuit structure further includes: a power supply circuit configured to provide the first voltage domain and the second voltage domain for the CAN transceiver and the CAN controller.

In some embodiments, the power supply circuit forms a first ground terminal and a second ground terminal that are isolated from each other and outputs a first supply voltage and a second supply voltage, where the CAN transceiver is connected to the first supply voltage and the first ground terminal and the CAN controller is connected to the second supply voltage and the second ground terminal.

In some embodiments, the power supply circuit includes an input power supply and an isolated power supply, where an input terminal of the isolated power supply is connected to the input power supply, an output terminal of the isolated power supply forms the first supply voltage and the first ground terminal and the isolated power supply is connected to the CAN transceiver for providing the first supply voltage and the first ground terminal for the CAN transceiver.

In some embodiments, the power supply circuit further includes a low-dropout linear voltage regulator, where an input terminal of the low-dropout linear voltage regulator is connected to the input power supply, an output terminal of the low-dropout linear voltage regulator forms the second supply voltage and the second ground terminal and the low-dropout linear voltage regulator is connected to the CAN controller for providing the second supply voltage and the second ground terminal for the CAN controller.

In some embodiments, the clamp circuit consists of a first diode and a second diode; and the pair of data buses consist of a first data line and a second data line, where an anode of the first diode is connected to the first data line, an anode of the second diode is connected to the second data line and cathodes of both the first diode and the second diode are connected to the first ground terminal.

In some embodiments, the clamp circuit is configured to restrict the low level of the differential signals to a ground terminal of the first voltage domain and the high level of the differential signals is equivalent to an operating voltage of the first voltage domain.

In some embodiments, a first connection terminal of the signal isolation circuit is connected to the CAN transceiver and a second connection terminal of the signal isolation circuit is connected to the CAN controller for isolating and converting a signal transmitted between the first voltage domain and the second voltage domain.

In some embodiments, the CAN transceiver is a CAN transceiver meeting a general standard ISO11898 and the differential signals transmitted on the data buses are CAN signals meeting an ISO11992 standard.

In order to resolve the above problems, the embodiments of the present invention further provide the following technical solution: a vehicle diagnostic device, including:

a CAN transceiver operating in a first voltage domain, where the CAN transceiver is connected to CAN buses of a to-be-detected vehicle for receiving and transmitting differential signals; a clamp circuit disposed between the CAN transceiver and the data bus for clamping the differential signals; a CAN controller operating in a second voltage domain, where the CAN controller is connected to the CAN transceiver for communicating with the CAN transceiver; and a signal isolation circuit disposed between the CAN transceiver and the CAN controller for isolating the first voltage domain from the second voltage domain; and a power supply circuit configured to provide the first voltage domain and the second voltage domain for the CAN transceiver and the CAN controller.

Compared with the prior art, the CAN circuit structure in the embodiments of the present invention may use a standard CAN transceiver chip that meets a general standard in a special CAN circuit structure such as a CAN protocol system for a 24V trailer, thus effectively reducing manufacturing costs of related devices.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To facilitate the understanding of the present invention, the present invention is further described below in further detail with reference to the accompanying drawings and specific embodiments. It is to be noted that, when an element is described to be "fixed on" another element, it may be directly fixed on the another element, or there may be one or more intermediate elements between them. When an element is described to be "connected to" another element, it may be directly connected to the another element, or there may be one or more intermediate elements between them. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component must have a particular orientation or must be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the technical field to which the present invention belongs. In the present invention, terms used in the specification of the present invention are merely intended to describe objectives of the specific embodiments, but are not intended to limit the present invention. A term "and/or" used in the present invention includes any or all combinations of one or more related listed items.

In addition, the technical features involved in the different embodiments of the present invention described below may be combined with each other so long as they do not constitute a conflict with each other.

The CAN specification 2.0 was formulated and released in 1991, which includes two parts: A and B. The part 2.0A provides a standard format for CAN messages and the part 2.0B is an extension. The J1939 protocol based on the CAN2.0B specification was further proposed in 2000.

Figure 1:
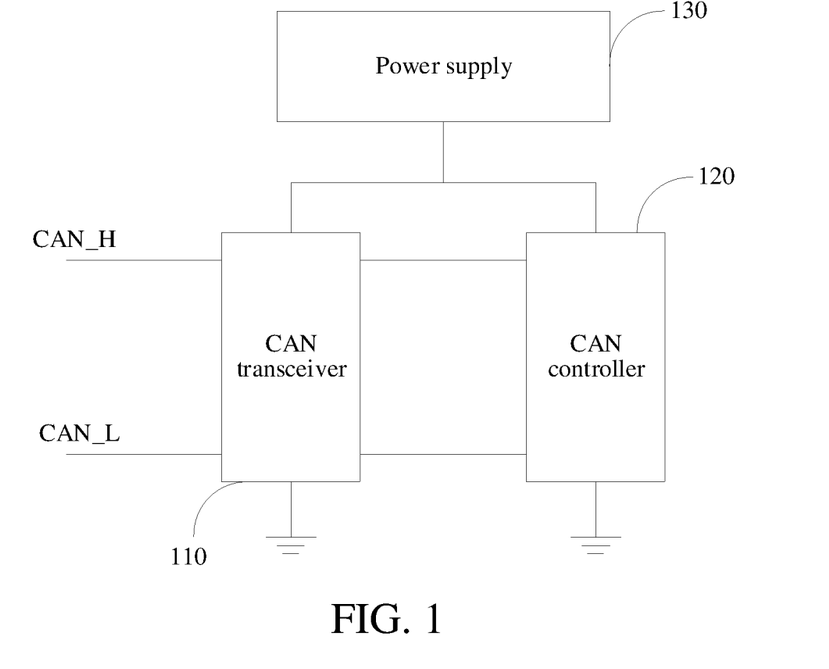
FIG. 1 is a schematic diagram of a typical CAN circuit structure.

FIG. 1 is a block diagram of a typical CAN circuit. As shown in FIG. 1, the CAN circuit block diagram includes a pair of data buses (respectively represented by CAN_H and CAN_L in FIG. 1), a CAN transceiver 110, a CAN controller 120 and a power supply 130.

The CAN transceiver 110 serves as a transmission medium to implement conversion into different data forms. In other words, a binary code stream is converted into a differential signal to be sent to the data bus and the differential signal is converted into a binary code stream to be received.

The CAN controller 120 is a control core for implementing a protocol bottom layer and a data link layer of the CAN bus. The CAN controller may generate a CAN frame and transmit the CAN frame to the CAN transceiver 110 in the binary code stream form, which is converted into a corresponding differential signal by the CAN transceiver. Alternatively, a binary code stream received from the CAN transceiver may be parsed and received.

Certainly, during transmission by the CAN controller, bit filling, CRC and response detection (during receiving by the CAN controller, transmission and receiving comparison is correspondingly performed, bit filling is removed and CRC is performed) may be further performed, or tasks such as conflict determining and error handling are performed during receiving.

The power supply 130 may be any type of power management system for outputting a stable and reliable DC voltage to supply power to the CAN transceiver 110 and the CAN controller 120. Specifically, the power supply 130 may be a power management system consisting of a low-dropout linear voltage regulator for outputting an operating voltage VCC required by the CAN transceiver and the CAN controller.

In the CAN circuit block diagram shown in FIG. 1, the differential signal transmitted on the data bus usually represents different information by using a high-low level difference between the two buses. For example, when the data line CAN_H has a low level and the data line CAN_L has a high level, it indicates binary information "0". However, when the data line CAN_H has a low level and the data line CAN_L has a high level, it indicates binary information "1".

For CANs following different standards, although logic settings may be similar, differences between voltages of differential signals transmitted on the data buses are usually different due to differences between voltage specifications.

Figure 2:
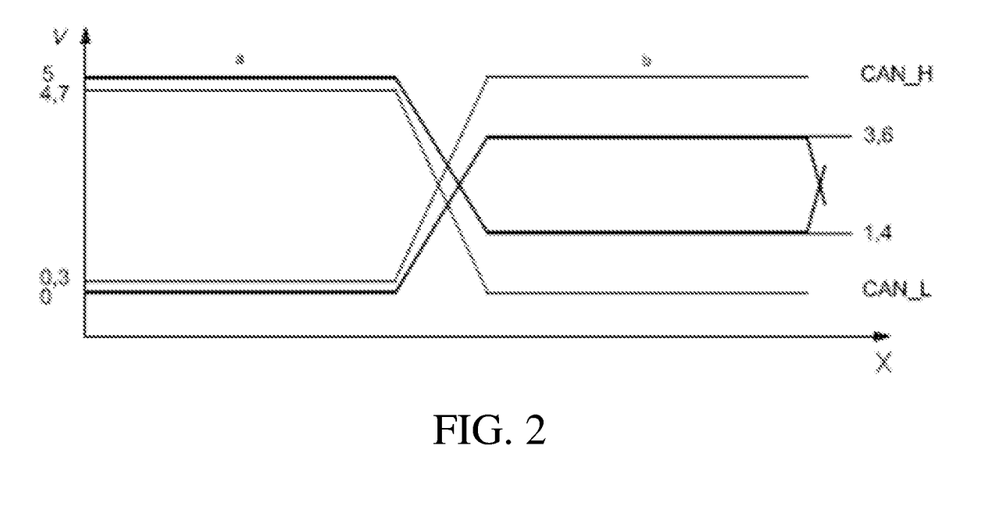
FIG. 2 is a logic diagram of CAN_H and CAN_L at a CAN physical layer of a general standard.
Figure 3:
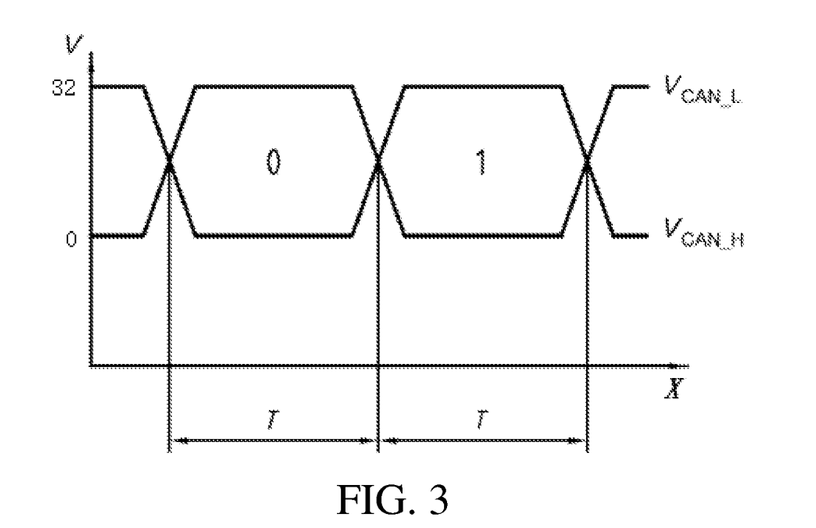
FIG. 3 is a logic diagram of CAN_H and CAN_L at a CAN physical layer of a 24V trailer.

For example, FIG. 2 is a logic diagram of CAN_H and CAN_L at a CAN physical layer of a general standard. FIG. 3 is a logic diagram of CAN_H and CAN_L at a CAN physical layer of a 24V trailer.

It can be seen from comparison between FIG. 2 and FIG. 3 that, in a dominant state (indicating information "0"), the highest level of CAN_L of the general standard is maintained at about 5V, but the highest level of CAN_L of the 24V trailer can be up to about 32V.

Therefore, CAN standards with different highest levels (differences between voltages of differential signals) have different requirements for use of the CAN transceiver 11. In order to adapt to different CAN protocols, adaptive CAN transceivers usually need to be designed for use.

For example, as shown in FIG. 2 and FIG. 3, since differences between voltages of the differential signals are very large in a voltage specification and standard for a 24V trailer, the CAN transceiver of the general standard cannot be used in the CAN for the 24V trailer. Instead, only a special CAN transceiver adapted to the standard for the 24V trailer can be used.

Compared with the CAN transceiver of the general standard, the CAN transceiver for the 24V trailer is specially adapted to a special CAN version. There are few CAN transceivers for the 24V trailer in the market and the price is relatively high, which results in relatively high costs of related devices connected to the CAN for the 24V trailer.

The CAN circuit structure provided in the embodiments of the present invention can still be applied to a CAN bus of other special standards even selecting a CAN transceiver chip meeting the general standard. In this way, fewer CAN transceiver chips of the special standard are required and the manufacturing costs of related devices are reduced.

Figure 4:
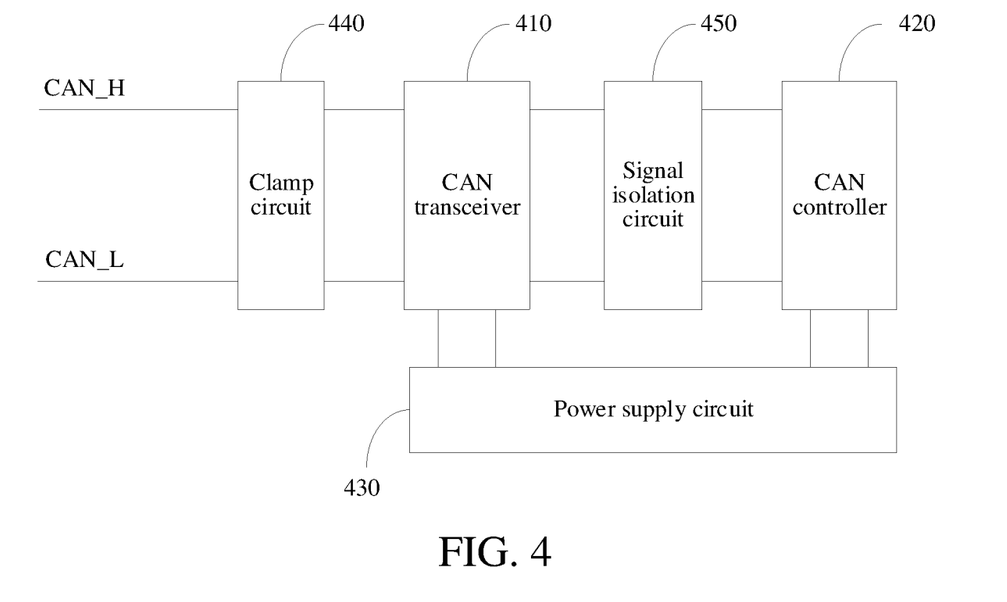
FIG. 4 is a structural block diagram of a CAN circuit structure according to an embodiment of the present invention.

FIG. 4 shows a CAN circuit structure according to an embodiment of the present invention. As shown in FIG. 4, the CAN circuit structure may consist of: a pair of data buses, a CAN transceiver 410, a clamp circuit 440, a CAN controller 420, a signal isolation circuit 450 and a power supply circuit 430.

The pair of data buses are respectively represented by CAN_H and CAN_L. Differential signals corresponding to a CAN protocol are transmitted on the data buses. Information is transmitted through a correspondence between CAN_H and CAN_L and a high level and a low level.

The CAN transceiver 410 is connected to the data buses CAN_H and CAN_L for receiving and transmitting the differential signals and implementing conversion between a differential signal and a binary digital signal. A "first voltage domain" consists of a ground terminal and a corresponding operating voltage. The ground terminal may not be a zero potential reference point for an entire system.

According to different standards to be met during design, a difference between voltages of high and low levels of the differential signals that can be received and sent by the CAN transceiver is constant. The expression "operating in a first voltage domain" is used herein to indicate a difference between voltages of differential signals that can be received and transmitted by the CAN transceiver 410.

In some embodiments, the CAN transceiver 410 may be a CAN transceiver meeting the general standard, for example, a CAN transceiver meeting an ISO11898 standard, thus implementing relatively low hardware costs.

The clamp circuit 440 is a functional circuit for maintaining a top or a bottom of a periodically changing waveform signal at a specified level. The clamp circuit 440 is disposed between the CAN transceiver 410 and the data buses CAN_H and CAN_L, which can restrict the high level or the low level of the differential signal to a specific level. In this way, the difference between the voltages of the differential signals transmitted on the data buses can be changed, to conform to a standard met by the CAN transceiver 410.

The CAN controller 420 may specifically be any suitable existing CAN controller, which can perform one or more functions (for example, perform operations such as bit filling, CRC, response detection and the like) disclosed in the above embodiments during information transmission and receiving.

Since the CAN transceiver 410 needs to adapt to the differential signal on the data bus, the CAN controller 420 operates in a normal voltage environment. Therefore, reference voltage points in the voltage environments in which the CAN controller 420 and the CAN transceiver 410 are located are different.

The expression "operating in a second voltage domain" is used herein to indicate an operating voltage and a ground terminal used by the CAN controller 420 during operation, which are different from those of the voltage environment in which the CAN transceiver 410 operates.

The signal isolation circuit 450 is disposed between the CAN transceiver 410 and the CAN controller 420. Specifically, the signal isolation circuit may adopt any type of circuit or chip that has a signal isolation effect, to ensure that both the CAN transceiver 410 and the CAN controller 420 can operate normally and that signals between the two can be converted accordingly without being affected by a voltage domain change.

The power supply circuit 430 is a functional module for power management, which may specifically adopt any power management chip capable of dual voltage outputting. The power supply circuit may be connected to the CAN transceiver 410 and the CAN controller 420 for providing corresponding first voltage domain and second voltage domain for the CAN transceiver 410 and the CAN controller 420.

In this embodiment, the power supply circuit 430 may serve as a discrete power management system with a plurality of different output terminals to meet power supplying demands of the CAN transceiver 410 and the CAN controller 420.

In some other embodiments, the power supply circuit 430 may be integrated into the CAN circuit structure as a part of the CAN circuit structure and provides the first voltage domain and the second voltage domain through two output terminals respectively.

For example, for a differential signal used in the 24V trailer system, if a low level of the differential signal is the zero potential reference, a high level of the differential signal is about 35V.

Therefore, in an actual CAN circuit structure, the operating voltage of the first voltage domain may be equivalent to the high level of the differential signals, which is also set to about 25V. In addition, the difference between the voltage of the ground terminal and the operating voltage of the first voltage domain is maintained at about 5V, to ensure that the CAN transceiver can be used.

The operating voltage of the second voltage domain is a normal operating voltage and the ground terminal thereof is also a zero potential reference, to maintain the normal operation of the CAN controller.

According to the CAN circuit structure provided in the embodiments of the present invention, on one hand, the difference between voltages of the high level and the low level on the data buses is restricted within a voltage difference range of the general standard through the clamp circuit that is additionally disposed, so that the CAN transceiver meeting the general standard can also be used in some CAN protocols of specific versions.

On the other hand, the CAN transceiver and a CAN receiver operating in two different voltage domains are connected through the signal isolation circuit, which implements voltage domain isolation and signal conversion for the two, thus ensuring that signals can be effectively transmitted between the two.

Figure 5:
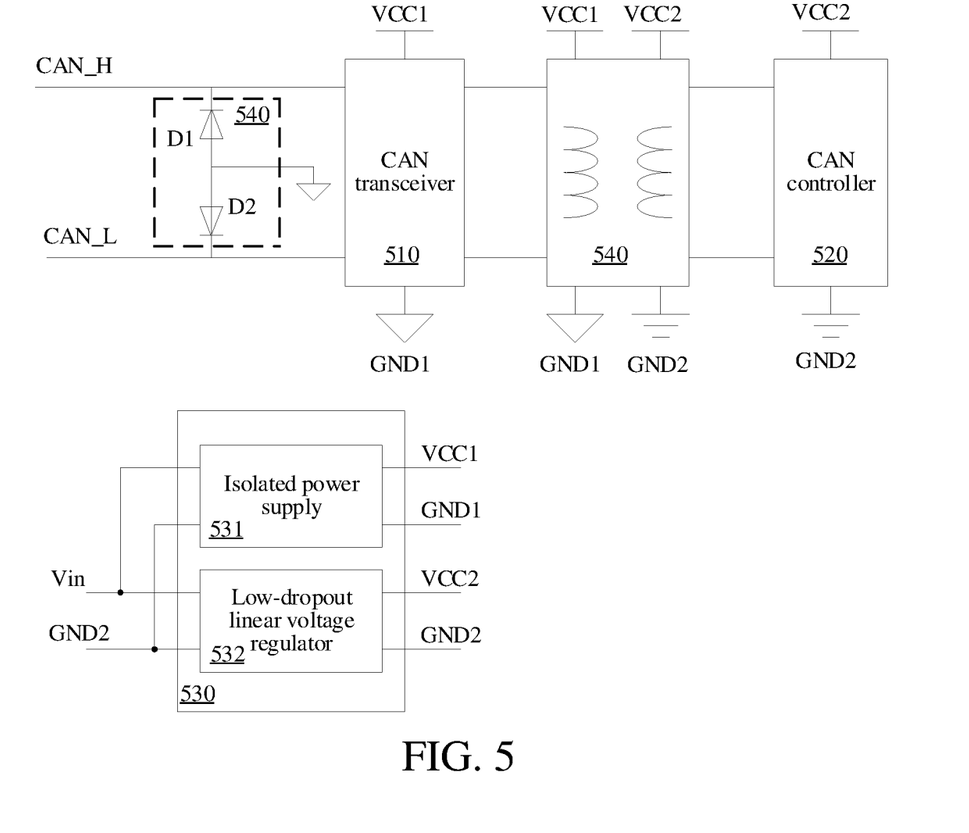
FIG. 5 is a schematic diagram of a CAN circuit structure according to an embodiment of the present invention.

FIG. 5 is a specific example of a CAN circuit structure according to an embodiment of the present invention. As shown in FIG. 5, a first ground terminal GND1 and a second ground terminal CND2 that are isolated from each other exist in the CAN circuit structure.

A CAN transceiver 510 is connected to the first ground terminal GND1 and operates at a first voltage VCC1. A CAN controller 520 is connected to the second ground terminal GND2 and operates at a second voltage VCC2.

The CAN transceiver 510 and the CAN controller 520 are connected to each other through a signal isolation chip 540. The signal isolation chip 540 isolates two different voltage domains in which the CAN transceiver 510 and the CAN controller 520 are located and implements conversion of signals for the two voltage domains.

The first ground terminal GND1, the second ground terminal CND2, the first voltage VCC1 and the second voltage VCC2 are all provided by a power supply circuit 530.

In some embodiments, the power supply circuit 530 consists of two parts: an isolated power supply 531 and a low-dropout linear voltage regulator 532, each having a corresponding output port for providing the first ground terminal GND1, the second ground terminal CND2, the first voltage VCC1 and the second voltage VCC2.

An input terminal of the power supply circuit 530 is connected to an input power supply Vin for receiving a voltage provided by the input power supply Vin. A ground terminal of the input power supply Vin is also the second ground terminal GND2 as a zero voltage point.

On one hand, an input terminal of the isolated power supply 531 is connected to the input power supply. After the input power supply is converted, the first voltage VCC1 and the first ground terminal GND1 are output at an output terminal of the isolated power supply. Since the isolated power supply is used, the first ground terminal GND1 and the second ground terminal GND2 output at the output terminal are isolated from each other.

On the other hand, the input terminal of the low-dropout linear voltage regulator 532 is also connected to the input power supply. Through the dropout linear voltage regulator 532, a pretty stable output voltage VCC2 (a second voltage) is provided for the CAN controller 520 for use. Certainly, the ground terminal of the low-dropout linear voltage regulator 532 is the same as the ground terminal of the input power supply, which is also the second ground terminal GND2.

In the above power supply circuit, the first voltage domain (that is, the first ground terminal GND1 and the first operating voltage VCC1) is provided for the CAN transceiver 510 through the isolated power supply 531 and the second voltage domain (that is, the second ground terminal GND2 and the second operating voltage VCC2) is further provided for the CAN controller 530 through the low-dropout linear voltage regulator 532.

Still referring to FIG. 5, in order to ensure that the difference between voltages of differential signals transmitted on the data buses is adapted to the CAN transceiver 510, the CAN circuit structure further includes a clamp circuit 540. The CAN transceiver 510 is connected to the data bus through the clamp circuit 540, which controls the difference between the voltages of the differential signals.

As shown in FIG. 5, in some embodiments, the clamp circuit 540 may consist of a first diode D1 and a second diode D2. A pair of data buses are respectively represented by a first data line CAN_H and a second data line CAN_L.

An anode of the first diode D1 is connected to the first data line CAN_H and an anode of the second diode D2 is connected to the second data line CAN_L. Cathodes of the first diode D1 and the second diode D2 are both connected to the first ground terminal GND1.

Low levels on the first data line CAN_H and the second data line CAN_L may be clamped to the first ground terminal GND1 through the above clamp circuit. A high level of the differential signal is equivalent to the first operating voltage VCC1 of the CAN transceiver 31. Therefore, the difference between the voltages of the differential signals transmitted on the data lines can adapt to the CAN transceiver 510.

During actual operation, the difference between the voltages of the high level and the low level of the differential signals transmitted on the data buses may be greater than a voltage specification standard met by the CAN transceiver 510. For example, a level value of the high level on the 24V trailer system is up to about 32V.

Therefore, after the low level (an initial level value is a zero potential reference point, that is, the second ground terminal GND2) on the first data line CAN_H or the second data line CAN_L is clamped to the first ground terminal GND1 (which is consistent with the ground terminal of the CAN transceiver 510) under the clamping action of the clamp circuit 35, the CAN transceiver that can meet only the general standard can also be applied to the 24V trailer system to receive or output a differential signal conforming to the CAN standard for the 24V trailer merely by maintaining the high level of the differential signal to be equivalent to the first operating voltage VCC1, thus reducing corresponding costs.

Figure 6:
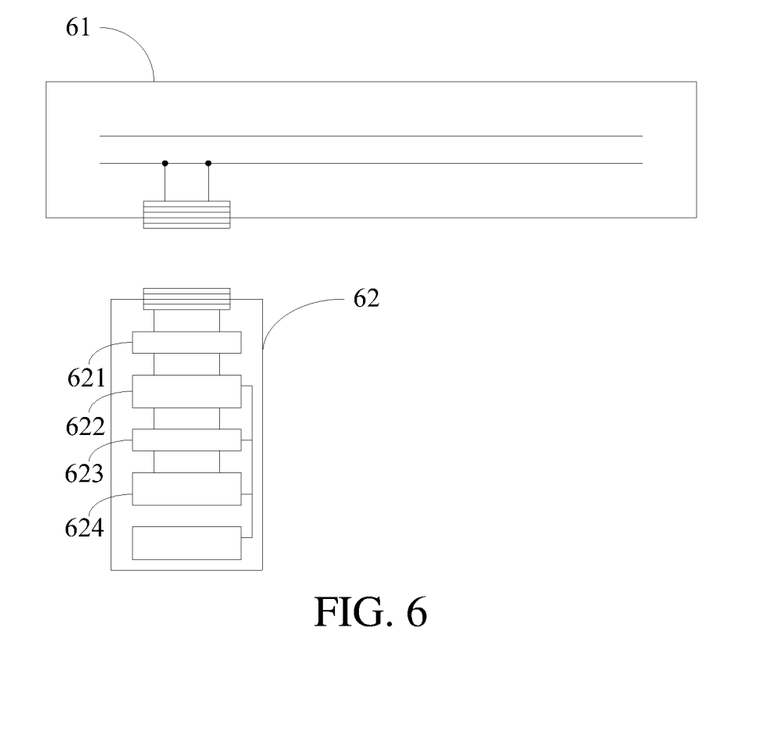
FIG. 6 is a schematic diagram of an application example of a CAN circuit structure according to an embodiment of the present invention.

The CAN circuit structure provided in the embodiments of the present invention may be further applied to many different related devices. FIG. 6 is an application example of a CAN circuit structure according to an embodiment of the present invention. As shown in FIG. 6, the CAN circuit structure may be applied to a diagnostic device 62 for diagnosing a trailer system 61.

The trailer system 61 is a typical vehicle control system that uses a CAN bus to implement real-time data communication between a plurality of functional nodes in a trailer. Generally, all data structures required for vehicle control, for example, throttle control are transmitted on the CAN bus.

The diagnostic device 62 is a data information reading device used for fault maintenance or overhaul. The diagnosis device 62 may communicate with the CAN bus in the trailer system 10 through a communication interface provided by the trailer system 61, to obtain related data information transmitted on the bus, to assist in completion of vehicle fault diagnosis.

As shown in FIG. 6, the CAN circuit structure disclosed in the above embodiments is applied in the diagnostic device 62, including a clamp circuit 621, a CAN transceiver 622, a signal isolation circuit 623, a CAN controller 624 and a power supply circuit 625.

The diagnostic device establishes a connection to the CAN bus of the trailer system 61 through a connection interface extending from the clamp circuit 621 and reads one or more pieces of related vehicle information transmitted in the CAN bus through the CAN transceiver 622, the CAN controller 624 and the like.

Certainly, one or more functional modules may be added to or deducted from the diagnostic device 62 according to actual situations. For example, the diagnostic device may be provided with a control button for receiving a control instruction from a user, or may be provided with a portable power supply such as a lithium battery for supplying power to the entire diagnostic device 62.

In this embodiment, although the CAN bus in the trailer system 61 uses a specific-version CAN protocol for a trailer of 24V or 12V, a CAN receiver meeting the general standard with lower costs, which is available in the market in a large quantity may still be used in the diagnostic device 62, which serves as a differential signal converter to receive and transmit differential signals meeting the CAN protocol of the specific version.

In this embodiment, due to the specific CAN circuit structure design, manufacturing costs of the diagnostic device can be effectively reduced and fewer special CAN receivers are required.

Specifically, the diagnostic device 20 may be a diagnostic device used for vehicle and device diagnosis of a 24V trailer system. The diagnostic device may be connected to the CAN bus of the 24V trailer through the above CAN circuit structure, to perform related device diagnosis operations. The CAN transceiver disposed in the diagnostic device 20 is a CAN transceiver chip that meets the general standard ISO11898.

A person skilled in the art should further understand that the steps of the exemplary CAN circuit network described with reference to the embodiments disclosed herein can be implemented in electronic hardware, computer software or a combination thereof. To clearly illustrate the interchangeability of hardware and software, the compositions and the steps of the various examples have been generally described in the above description in terms of functionality. Whether the functions are performed by hardware or software depends on specific applications and design constraints and conditions of the technical solutions.

Persons skilled in the art can use different methods to implement the described functions for each particular application, but it should not be considered that the implementation goes beyond the scope of the embodiments of the present invention. The computer software may be stored in a computer-readable storage medium. When the program is executed, the program may include the procedures of the embodiments of the foregoing methods. The storage medium may be a magnetic disk, an optical disc, a read-only memory, a random access memory or the like.

Finally, it is to be noted that, the foregoing embodiments are merely intended for describing the technical solutions of the present invention, but not for limiting the present invention. Under the thinking of the present invention, combinations may also be made between the technical characteristics in the foregoing embodiments or in different embodiments, the steps may be implemented in any order, and there are many other variations in different aspects of the invention as described above, which are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A controller area network (CAN) circuit structure, comprising:
    a pair of data buses on which differential signals are transmitted;
    a CAN transceiver operating in a first voltage domain, wherein the CAN transceiver is connected to the data buses for receiving and transmitting the differential signals;
    a clamp circuit disposed between the CAN transceiver and the data buses for clamping a high level or a low level of the differential signals, so that a difference between voltages of the differential signals is adapted to the CAN transceiver, wherein the clamp circuit is configured to restrict the low level of the differential signals to a ground terminal of the first voltage domain and restrict the high level of the differential signals to an operating voltage of the first voltage domain;
    a CAN controller operating in a second voltage domain, wherein the CAN controller is connected to the CAN transceiver for communicating with the CAN transceiver;
    a signal isolation circuit disposed between the CAN transceiver and the CAN controller for isolating the first voltage domain from the second voltage domain; and
    a power supply circuit configured to provide the first voltage domain and the second voltage domain for the CAN transceiver and the CAN controller, wherein the power supply circuit forms a first ground terminal and a second ground terminal that are isolated from each other and outputs a first supply voltage and a second supply voltage, and the CAN transceiver is connected to the first supply voltage and the first ground terminal and the CAN controller is connected to the second supply voltage and the second ground terminal;
    wherein the power supply circuit comprises an input power supply and an isolated power supply, wherein an input terminal of the isolated power supply is connected to the input power supply; and
    an output terminal of the isolated power supply forms the first supply voltage and the first ground terminal and the isolated power supply is connected to the CAN transceiver for providing the first supply voltage and the first ground terminal for the CAN transceiver.

2. The CAN circuit structure according to claim 1, wherein the power supply circuit further comprises a low-dropout linear voltage regulator, wherein an input terminal of the low-dropout linear voltage regulator is connected to the input power supply,
    an output terminal of the low-dropout linear voltage regulator forms the second supply voltage and the second ground terminal and the low-dropout linear voltage regulator is connected to the CAN controller for providing the second supply voltage and the second ground terminal for the CAN controller.

3. The CAN circuit structure according to claim 1, wherein the clamp circuit consists of a first diode and a second diode and the pair of data buses consist of a first data line and a second data line, wherein an anode of the first diode is connected to the first data line, an anode of the second diode is connected to the second data line and cathodes of both the first diode and the second diode are connected to the first ground terminal.

4. The CAN circuit structure according to claim 1, wherein a first connection terminal of the signal isolation circuit is connected to the CAN transceiver and a second connection terminal of the signal isolation circuit is connected to the CAN controller for isolating and converting a signal transmitted between the first voltage domain and the second voltage domain.

5. The CAN circuit structure according to claim 1, wherein the CAN transceiver is a CAN transceiver meeting a general standard ISO11898 and the differential signals transmitted on the data buses are CAN signals meeting an ISO11992 standard.

6. A vehicle diagnostic device, comprising:
a controller area network (CAN) transceiver operating in a first voltage domain, wherein the CAN transceiver is connected to CAN buses of a to-be-detected vehicle for receiving and transmitting differential signals;
a clamp circuit disposed between the CAN transceiver and the data bus for clamping the differential signals, wherein the clamp circuit is configured to restrict the low level of the differential signals to a ground terminal of the first voltage domain and restrict the high level of the differential signals to an operating voltage of the first voltage domain;
a CAN controller operating in a second voltage domain, wherein the CAN controller is connected to the CAN transceiver for communicating with the CAN transceiver; and
a signal isolation circuit disposed between the CAN transceiver and the CAN controller for isolating the first voltage domain from the second voltage domain; and
a power supply circuit configured to provide the first voltage domain and the second voltage domain for the CAN transceiver and the CAN controller;
wherein the power supply circuit forms a first ground terminal and a second ground terminal that are isolated from each other and outputs a first supply voltage and a second supply voltage, wherein the CAN transceiver is connected to the first supply voltage and the first ground terminal and the CAN controller is connected to the second supply voltage and the second ground terminal;
wherein the power supply circuit comprises an input power supply and an isolated power supply, wherein an input terminal of the isolated power supply is connected to the input power supply; and
an output terminal of the isolated power supply forms the first supply voltage and the first ground terminal and the isolated power supply is connected to the CAN transceiver for providing the first supply voltage and the first ground terminal for the CAN transceiver.

7. The vehicle diagnostic device according to claim 6, wherein the power supply circuit further comprises a low-dropout linear voltage regulator, wherein an input terminal of the low-dropout linear voltage regulator is connected to the input power supply,
an output terminal of the low-dropout linear voltage regulator forms the second supply voltage and the second ground terminal and the low-dropout linear voltage regulator is connected to the CAN controller for providing the second supply voltage and the second ground terminal for the CAN controller.

8. The vehicle diagnostic device according to claim 6, wherein the clamp circuit consists of a first diode and a second diode and the pair of data buses consist of a first data line and a second data line, wherein
an anode of the first diode is connected to the first data line, an anode of the second diode is connected to the second data line and cathodes of both the first diode and the second diode are connected to the first ground terminal.

9. The vehicle diagnostic device according to claim 6, wherein a first connection terminal of the signal isolation circuit is connected to the CAN transceiver and a second connection terminal of the signal isolation circuit is connected to the CAN controller for isolating and converting a signal transmitted between the first voltage domain and the second voltage domain.

10. The vehicle diagnostic device according to claim 6, wherein the CAN transceiver is a CAN transceiver meeting a general standard ISO11898 and the differential signals transmitted on the data buses are CAN signals meeting an ISO11992 standard.

11. A controller area network (CAN) circuit structure, comprising:
a pair of data buses on which differential signals are transmitted;
a CAN transceiver operating in a first voltage domain, wherein the CAN transceiver is connected to the data buses for receiving and transmitting the differential signals;
a clamp circuit disposed between the CAN transceiver and the data buses for clamping a high level or a low level of the differential signals, so that a difference between voltages of the differential signals is adapted to the CAN transceiver, wherein the clamp circuit is configured to restrict the low level of the differential signals to a ground terminal of the first voltage domain and restrict the high level of the differential signals is equivalent to an operating voltage of the first voltage domain;
a CAN controller operating in a second voltage domain, wherein the CAN controller is connected to the CAN transceiver for communicating with the CAN transceiver;
a signal isolation circuit disposed between the CAN transceiver and the CAN controller for isolating the first voltage domain from the second voltage domain; and
a power supply circuit configured to provide the first voltage domain and the second voltage domain for the CAN transceiver and the CAN controller;
wherein
the power supply circuit forms a first ground terminal and a second ground terminal that are isolated from each other and outputs a first supply voltage and a second supply voltage,
the CAN transceiver is connected to the first supply voltage and the first ground terminal and the CAN controller is connected to the second supply voltage and the second ground terminal;
the power supply circuit further comprises a low-dropout linear voltage regulator,
an input terminal of the low-dropout linear voltage regulator is connected to the input power supply, and
an output terminal of the low-dropout linear voltage regulator forms the second supply voltage and the second ground terminal and the low-dropout linear voltage regulator is connected to the CAN controller for providing the second supply voltage and the second ground terminal for the CAN controller.

12. The CAN circuit structure according to claim 11, wherein the clamp circuit consists of a first diode and a second diode and the pair of data buses consist of a first data line and a second data line, an anode of the first diode is connected to the first data line, an anode of the second diode is connected to the second data line, and cathodes of both the first diode and the second diode are connected to the first ground terminal.

13. The CAN circuit structure according to claim 11, wherein a first connection terminal of the signal isolation circuit is connected to the CAN transceiver and a second connection terminal of the signal isolation circuit is connected to the CAN controller for isolating and converting a signal transmitted between the first voltage domain and the second voltage domain.

14. The CAN circuit structure according to claim 11, wherein the CAN transceiver is a CAN transceiver meeting a general standard ISO11898 and the differential signals transmitted on the data buses are CAN signals meeting an ISO11992 standard.

\* \* \* \* \*